United States Patent [19]

Boyer

[11] Patent Number: 4,798,934

[45] Date of Patent: Jan. 17, 1989

[54] ELECTRICAL VENTED HANDPIECE

[76] Inventor: Robert E. Boyer, 101 Patricia La., Prospect Heights, Ill. 60070

[21] Appl. No.: 855,077

[22] Filed: Apr. 22, 1986

[51] Int. Cl.$^4$ .................. H05B 1/00; H05B 3/00; B23K 3/04

[52] U.S. Cl. .................. 219/233; 16/116 R; 30/140; 219/227; 219/229; 219/533; 228/51

[58] Field of Search .................. 219/221, 227–241, 219/533; 16/116 R; 228/51–55; 30/140

[56] References Cited

U.S. PATENT DOCUMENTS

| | | | |
|---|---|---|---|
| 1,190,447 | 7/1916 | Munger et al. | 219/233 |
| 1,572,666 | 2/1926 | Marsden | 219/229 X |
| 2,033,897 | 3/1936 | Jenkins et al. | 219/233 X |
| 2,488,477 | 11/1949 | Rapaport | 219/240 |
| 2,498,328 | 2/1950 | Atkins | 219/227 X |
| 2,763,762 | 9/1956 | Jepson | 219/231 |
| 2,997,684 | 8/1961 | Cole | 219/237 X |
| 3,121,781 | 2/1964 | Schoenwald | 219/237 |
| 3,141,088 | 7/1964 | Johnson | 219/236 |
| 3,526,750 | 9/1970 | Siegel | 219/233 |
| 3,558,854 | 1/1971 | Siegel et al. | 219/233 |

FOREIGN PATENT DOCUMENTS

| | | | |
|---|---|---|---|
| 2723654 | 11/1978 | Fed. Rep. of Germany | 219/233 |
| 811682 | 1/1937 | France | 219/233 |
| 1381087 | 1/1964 | France | 219/229 |
| 614082 | 12/1948 | United Kingdom | 219/233 |

Primary Examiner—Anthony Bartis
Attorney, Agent, or Firm—Wallenstein Wagner30 Hattis & Strampel, Ltd.

[57] ABSTRACT

A hand-held electrically heated tool for applying heat to an object includes an elongated metallic tubular handle open at its forward and rear ends and having a plurality of raised relatively-spaced longitudinally extending vanes formed on its the inner surface and extending between the forward and rear ends thereof. An exposed metal electrical resistance heating element forming a wire tip is mounted in an insulator disposed in the forward end of the handle in engagement with the vanes with the tip extending forwardly of the handle. A spherically concave portion of the insulator reflects heat away from the handle. The vanes extend forwardly of the handle to form prongs spacing the insulator a distance from the forward end of the handle to allow exterior cooling air to enter air spaces defined by the vanes between the insulator and inner surface of the handle, flow the length of the handle, and exit through openings formed in the rear end of the handle by removal of the wall of the handle at discrete areas to expose the vanes and the air spaces therebetween. The outer surface of the handle is fluted to increase heat dissipation and enable comfortable gripping.

11 Claims, 2 Drawing Sheets

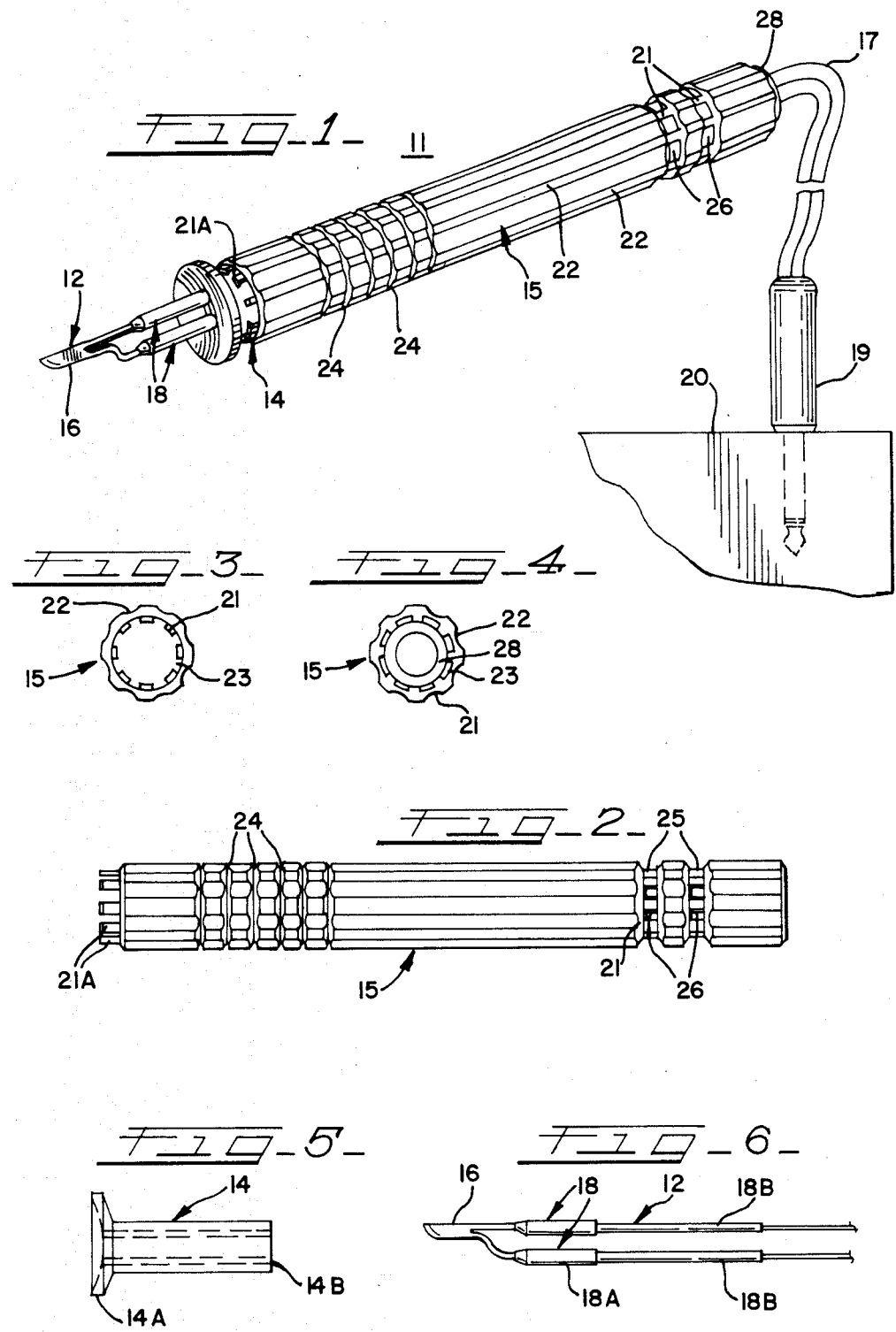

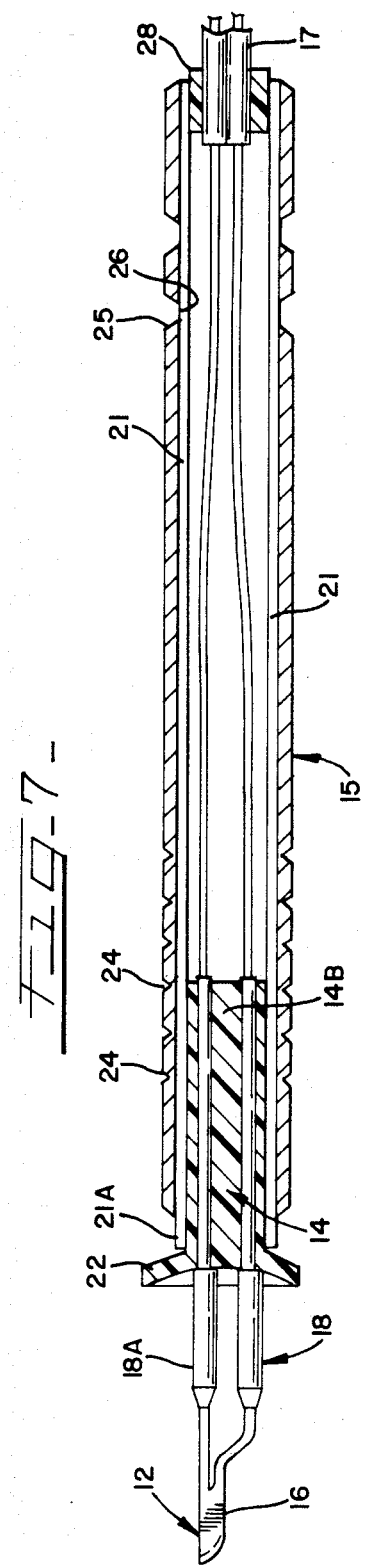

ELECTRICAL VENTED HANDPIECE

DESCRIPTION

1. Technical Field

The invention relates to electrically heated, manually used handpiece for providing heat selectively to areas of an object such as for decorative wood burning.

2. Background of the Invention

The device comprises an electrically heated tip mounted by an insulator onto an elongated handpiece adapted for use manually as wood burning tool by user. Portions of the handle are vented externally allowing any heat developed by the leads or the electrodes to be vented outwardly through the holes to thereby provide a much cooler operating device.

Many and varied manually operated electrically powered woodburning tools, are known in the prior art. In various prior art, the devices may be formed to have an external tubular handle of a fiber, wood, or other nonconductive material to insulate the user's fingers from the heat generated by the burning tip or the connecting leads. The handles are frequently of a substantial diameter to shield and space the user's fingers from the heated tip and to provide maximum heat insulation between the tip electrodes and the user's fingers. It has been found, however, that this prior art, the tubular handles, while they are insulators, do not radiate the heat but tend to retain the heat, and after a period of use the handle will become uncomfortable to the user's fingers.

Certain other prior art devices are comprised of internal metal tubing, which act as radiators to dissipate the heat to the ambient air to try to prevent the handle from becoming overheated; however, the handle often does not dissipate the heat adequately and becomes quite hot and uncomfortable for the user.

SUMMARY OF THE INVENTION

The inventive handpiece avoids the prior art problems of overheating of the handle, by providing a new, improved overall assembly including an improved handle. The handle includes an elongated, tubular member through which the electrical leads connect through respective electrodes to the tip assembly of the device. The handle provides a chimney effect to vent the hot air outwardly and prevent the handle from becoming uncomfortably hot to the user. Further, I provide an insulating mounting for the electrodes connecting to the burning tip to prevent direct conduction heating to the handle. I also provide an improved, hotter tip without increasing the heat developed at the handle.

Other aspects of the invention will become apparent upon making reference to the accompanying specification, drawing and claims, wherein:.

FIG. 1 is an isometric view of the inventive handpiece,

FIG. 2 is a plan view of the handle of the handpiece of FIG. 1,

FIG. 3 is an end view of the forward or tip-holding end of the handpiece of FIG. 2, FIG. 4 is an end view of the rear or upper end of the handpiece and showing a wire strain relief bushing mounted therein, FIG. 5 is a plan view of the tip assembly mounting reflector insulator of FIG. 1, FIG. 6 is a plan view of a preferred embodiment of a tip assembly used in the inventive handle, and FIG. 7 is a longitudinal cross-section view of the inventive handpiece shown in FIG. 1

DESCRIPTION OF THE INVENTION

FIG. 1 shows the inventive handpiece 11, which comprises a burning tip assembly 12 mounted as by a reflector/insulator 14 onto a tubular handle 15 formed of extruded material such as aluminum or plastic. As is known, the handpiece 11 is used substantially as a pen or pencil to apply heat to a point or area of an object. The burning tip assembly 12 is connected by suitably insulated electrical leads 17 to terminal 19 of any suitable design, which connects to a source of power through an electrical control box 20, also of suitable known design.

The tip assembly 12 is shown in detail in FIG. 6 and comprises an electric resistance heating element shaped to form a burning tip 16 having terminal electrodes 18. Referring back to FIG. 1 and also FIG. 5, the electrodes 18 are inserted into and securely mounted in insulator 14, made such as from Teflon TM plastic. The forward portion 18A of electrodes 18, that is, those portions which extend outwardly of the insulator 14, are larger in diameter and extend forwardly of the insulator. The after portion 18B of the electrodes 18, which are securely inserted into the insulator 14 and which connect to the electrical leads 17, are of a reduced diameter.

It should be understood at the outset that the burning tip 16 may be of any suitable size and shape, and that a number of shapes are utilized dependent upon the particular type of carving, etching, sealing, cutting, or embellishment of the product desired. The electrodes 18 are of a highly conductive material, which provides excellent electrical conductivity thus effecting minimal resistance to current flow and hence minimal heat build-up.

Referring now particularly to FIG. 5, the forward end 14A of insulator 14 is spherically concave in a forward direction, that is, toward the tip or front end of the assembly. The concavity functions as a heat reflector to reflect heat away from the user's fingers, and also as an insulator. The after end 14B of insulator 14 is rod-shaped and solidly inserted and fitted into the end of handle 15.

The details of tubular handle 15 are shown in FIGS. 1, 2, 3, and 4. As best shown in FIG. 3, handle 15 has a gear-like, or interrupted spaced, projections forming longitudinally extending vanes 21 on the inner surface of the handle 15. Vanes 21 extend longitudinally from the tip or front end of handle 15 to the other or rear end of the handle. The rod-shaped portion 14B insulator 14 is mounted or fitted in the inner diameter surface of the vanes 21, and importantly, therefore, there is a plurality of internal elongated air spaces or grooves 23 extending from front end of the tubular handle 15 to the rear end of the tubular handle. The elongated, longitudinally extending spaces 23 formed by the vanes 21 and the inner surface of the handle 15, provide air conductive spaces or chimneys.

The vanes 21 extend slightly forward, as at 21A of FIG. 2, at the front end of handle 15 to permit the insulator 14 to be mounted slightly forward of the end of the handle to position the hot tip 12 an increased distance or spacing from the user's fingers. The outer surface of tubular handle 15 is of an elongated, fluted design, as at 22, to provide additional cooling surfaces, see FIGS. 3 and 4.

External circumferential grooves or indentations 24 are formed near the front or tip end of the handle 15 to provide a convenient gripping area for the user.

Importantly, external circumferentially cut grooves 25 are formed near the rear end of the tube on the surface of the tube to a depth such as to expose the internal vanes 21 and the air spaces 23 to thereby form windows or vents 26 open to the ambient air. The windows or vents 26 communicate with the air spaces 23 to effect a chimney or venting effect for the heat generated at the front or tip end of handle 15.

A wire strain relief bushing 28 is inserted in the rear end of handle 15 to space the electrical leads from the handle 15. The vanes 21 position the bushing 28 within their inner diameter to maintain the air spaces 23 open from the tip 12 end of handle 15 and past the bushing to the rear end of the handle between the bushing 28 and the tube 15. The insulated leads 17 are of a lesser diameter than the diameter of the internal diameter of the wire strain relief bushing 28 and form an additional air space between the bushing and the leads.

Note that the tubular handle 15 dissipates heat much like a heat exchanger due to the extended surface and internal vanes 21. The vanes 21 also hold the insulator 14 away from the wall of the handle 15 allowing a free flow of air internally in the handle 15. Further, the shape of the internal vanes 21 enables the tubular wall to be cut as at 25 to form the windows or vents 26, which allow the escape of the free flowing air within the handle 15, thereby creating a chimney effect. The vanes 21 further position the bushing 28 and leads 17 away from the wall of the handle creating an additional opening for the free flowing air.

The longitudinally fluted, external surface, as at 22, of the handle 15 also provides a maximum surface for heat dissipation. The fluted outside surface also assures that the fingers of the user make less than full contact with the surface thereby lessening the heat transfer to the fingers while still providing a comfortable finger grip area. The user's finger comfort is also enhanced by cutting external radial grooves 24 at the finger contact point on the handle.

As mentioned above, the insulator 14 is designed to reflect the heat from the tip 12. The spherical, concave radius of the reflector 14A reflects the heat waves forwardly and away from the user's fingers to afford an added amount of protection of the fingers of the user.

While the invention has been particularly shown and described with reference to a preferred embodiment thereof, it will be understood by those skilled in the art that various changes in form and details may be made therein without departing from the spirit and scope of the invention.

I claim:

1. A hand-held device having an electrically heated tip for applying heat to an object, said device being selectively useful such as for decorative burning, etching, sealing, and cutting, and comprising in combination:
    (a) an exposed metal electrical resistance heating element forming a wire tip,
    (b) terminal electrodes affixed to the ends of said heating element, said electrodes being connected through suitable leads to a source of electrical power to provide electrical energy to heat said tip,
    (c) a metallic elongated and tubular handle, said handle being open at its forward and rear ends,.
    (d) an insulator mounting receiving said electrodes in fixed relation and disposed in said forward end of said handle to position said electrodes and said tip adjacent said forward end of said handle with said tip extending forwardly of said forward end,
    (e) said handle having a plurality of raised and relatively-spaced longitudinally-extending vanes formed on the inner surface thereof, thereby forming elongated air spaces between said insulator and the inner surface of said handle, said vanes extending longitudinally within the tubular handle between said open forward end thereof,
    (f) the front end of said air spaces being open to allow a flow of air to enter said air spaces,
    (g) a plurality of openings formed in the rear of said tubular handle communicating with elongated air spaces from by said internal vanes whereby residual heat generated by said tip is vented from the rear end of said handle through said rear openings by said air flow, and thereby tend to maintain the temperature of said handle at a more comfortable level when the device is being used, and,
    (h) a plurality of said vanes extending forwardly of said tubular handle as prongs engageable by said insulator to advance said insulator a distance from the forward end of said handle.

2. A device as in claim 1, wherein said insulator mounting comprises a rod-shaped member inserted into the front end of said handle and a relatively enlarged spherically concave portion formed at the forward end of said rod-shaped member for reflecting heat from said tip away from said handle.

3. A device as in claim 2, wherein the rod-shaped member is inserted and mounted in position against the inner surface of said vanes.

4. A device as in claim 3, wherein the outer surface of said tubular handle includes longitudinally-extending flutes for increasing the heat dissipation surface, and for permitting more comfortable holding of said handle by the user.

5. A device as in claim 1 wherein said handle includes windows are formed by removing the surface of said tube at discrete areas to expose said vanes and said air spaces between said vanes.

6. A device as in claim 24, further including a strain relief bushing positioned in the rear end of said tubular handle with the outer surface of the bushing engaging the inner surface of the vanes to thereby permit the air spaces between the vanes to open to the ambient air.

7. A device as in claim 1, wherein said rear openings are formed by removing the wall of said tubular handle at discrete areas to expose said vanes and said air spaces between said vanes.

8. A device as in claim 1, wherein the outer surface of the tubular handle includes circumferentially-extending flutes and grooves, said grooves increasing the heat dissipation area and enabling a comfortable gripping surface.

9. A device as in claim 1, wherein part of the electrodes extend forwardly from said insulator, and wherein the forwardly-extending part is of greater diameter than the part received in said insulator.

10. A device as in claim 1, wherein said leads connect to a control box for controlling the energy provided to heat said tip.

11. The device of claim 1, wherein said forwardly-extending vanes and said insulator mounting are configured so that the spaces between the forward ends of said prongs comprise openings providing communication between said elongated air spaces and the exterior atmosphere.

* * * * *